(12) United States Patent
Williams et al.

(10) Patent No.: US 10,716,734 B2
(45) Date of Patent: Jul. 21, 2020

(54) BLOOD BAG AND BLOOD BAG LABEL WITH SUCH A LABEL

(71) Applicant: Adhex Technologies, Chenôve (FR)

(72) Inventors: Maud Williams, Dijon (FR); Andrée-Noëlle Dufour, Gevrey Chambertin (FR); Julie Matray, Chenove (FR); Christine Perrin, Dijon (FR)

(73) Assignee: ADHEX TECHNOLOGIES, Chenôve (FR)

( * ) Notice: Subject to any disclaimer, the term of this patent is extended or adjusted under 35 U.S.C. 154(b) by 436 days.

(21) Appl. No.: 15/849,202

(22) Filed: Dec. 20, 2017

(65) Prior Publication Data

US 2018/0168931 A1  Jun. 21, 2018

(30) Foreign Application Priority Data

Dec. 21, 2016  (FR) ..................................... 16 62999

(51) Int. Cl.
*A61J 1/18* (2006.01)
*A61J 1/14* (2006.01)
(Continued)

(52) U.S. Cl.
CPC . *A61J 1/18* (2013.01); *A61J 1/10* (2013.01); *A61J 1/1468* (2015.05); *C09J 7/22* (2018.01);
(Continued)

(58) Field of Classification Search
None
See application file for complete search history.

(56) References Cited

U.S. PATENT DOCUMENTS 4,880,425 A * 11/1989 Kuhlemann .......... A61J 1/1412
604/404
5,314,421 A *  5/1994 Leuenberger ............. G09F 3/02
283/117
(Continued)

FOREIGN PATENT DOCUMENTS

EP       1306206 A1 *  5/2003 ................. C09J 7/40
EP       2806004 A1 * 11/2014 ............. C08G 18/76
(Continued)

OTHER PUBLICATIONS

Written Opinion dated Sep. 22, 2017, for French Application No. 1662999, filed Dec. 21, 2016, 8 pages.
(Continued)

*Primary Examiner* — Ophelia A Hawthorne
*Assistant Examiner* — Alexander W Zoellick
(74) *Attorney, Agent, or Firm* — Christensen O'Connor Johnson Kindness PLLC

(57) ABSTRACT

The present invention relates to an adhesive label intended to be secured to a blood bag made of Polyvinyl chloride (PVC), styrenic block copolymer, polypropylene or the like, wherein the adhesive label comprises a flexible support and a layer of pressure-sensitive adhesive deposited on a surface of the support; wherein the label is noteworthy in that the support has a mineral filler rate of silica and/or calcium carbonate (CaCO3) and/or the like, of less than 50%, and wherein at 115° C., the support has an elongation greater than or equal to 2% when a test piece 1.5 cm wide of the support is suspended under tension by a weight of 375 g for ↓minutes, and wherein the blood bag at 115° C. has an elongation of at least 100% when a 1.5 cm wide test piece of a blood bag is suspended under tension by a weight of 375 g for 75 minutes.

15 Claims, 2 Drawing Sheets

(51) Int. Cl.
  *A61J 1/10*   (2006.01)
  *G09F 3/00*   (2006.01)
  *C09J 7/26*   (2018.01)
  *C09J 7/24*   (2018.01)
  *C09J 7/22*   (2018.01)
  *C09J 7/38*   (2018.01)

(52) U.S. Cl.
  CPC ............... *C09J 7/243* (2018.01); *C09J 7/26* (2018.01); *C09J 7/38* (2018.01); *G09F 3/0291* (2013.01); *A61J 2205/10* (2013.01); *A61J 2205/30* (2013.01); *C09J 2201/122* (2013.01); *C09J 2201/606* (2013.01); *C09J 2201/622* (2013.01); *C09J 2203/334* (2013.01); *C09J 2205/106* (2013.01); *C09J 2400/123* (2013.01); *C09J 2423/046* (2013.01); *C09J 2423/106* (2013.01)

(56) References Cited

U.S. PATENT DOCUMENTS

| | | | | |
|---|---|---|---|---|
| 6,162,858 | A * | 12/2000 | Auguste | C09J 7/26 524/492 |
| 7,588,193 | B2 * | 9/2009 | Lowmaster | A61J 1/1406 235/462.01 |
| 2006/0196951 | A1 * | 9/2006 | Lowmaster | G09F 3/0297 235/494 |
| 2013/0327677 | A1 * | 12/2013 | McDorman | B65D 77/04 206/524.2 |
| 2014/0154442 | A1 * | 6/2014 | Bent | A61J 1/18 428/35.2 |
| 2015/0344741 | A1 * | 12/2015 | Blackwell | C09J 7/38 156/60 |
| 2016/0319164 | A1 * | 11/2016 | Mukherjee | A61J 1/18 |
| 2016/0335927 | A1 * | 11/2016 | Lux | B41F 13/12 |

FOREIGN PATENT DOCUMENTS

| | | | | |
|---|---|---|---|---|
| FR | 2770221 | A1 * | 4/1999 | ............ C09J 7/26 |
| WO | WO-9310007 | A1 * | 5/1993 | ........... C08K 5/0083 |
| WO | WO-02097001 | A1 * | 12/2002 | ........... B29C 55/023 |

OTHER PUBLICATIONS

Search Report dated Sep. 22, 2017, for French Application No. 1662999, filed Dec. 21, 2016, 3 pages.

* cited by examiner

BLOOD BAG AND BLOOD BAG LABEL WITH SUCH A LABEL

CROSS-REFERENCE TO RELATED APPLICATION

This application claims the benefit of FR 1662999, filed Dec. 21, 2016, which is incorporated herein by reference in its entirety.

BACKGROUND

The present invention relates to a blood bag label and a blood bag provided with such a label. The invention relates more particularly to a blood bag label avoiding the appearance of defects such as edging, folds, orange peel and "tunneling" when the blood bag is sterilized.

In the field of blood treatment, it is well known to store blood components in flexible plastic containers commonly known as blood bags. The blood bags are usually made of a flexible polyvinyl chloride (PVC) film comprising a plasticizer, generally di-2-ethylhexyl phthalate commonly known as DEHP (diethylhexyl phthalate).

In order to enable identification of certain information on the blood bag such as blood component, collection date, product code and batch number, etc., it is well known to provide labels for blood bags wherein the information is, in particular, represented by a bar code or the like.

Initially, the labels were made of paper. However, these paper labels had the disadvantage of not being strong enough and did not allow the transmission of gas.

In fact, it is known to treat the blood components stored in the blood bags by centrifuging them. Prior to use, the blood bags are sterilized, for example, using an autoclave sterilization process which is the most commonly used sterilization process. In particular, during these processes, the labels may be wetted and subjected to extreme temperatures of more than 100° C. in particular during sterilization. The paper labels may then crack or wrinkle during these processes. Cracking or wrinkling of a label may render the bar code of the label unreadable by a bar code reader, forcing an operator to manually enter data into a computer, or may even make it completely unreadable, which increases the risk of errors. Labels may also come off completely or partially during sterilization, resulting in a risk of data loss.

In addition, the blood bags must allow the transmission of gas through the pocket to maintain the viability of blood cells stored therein. In this respect, it is necessary that the bag should allow the carbon dioxide to escape from the blood bag and allow the passage of oxygen into the bag.

In order to overcome the disadvantages of paper labels for blood bags, synthetic labels have already been devised which are easy to print, resistant to sterilization conditions and allow gaseous exchanges with the contents of the blood bags. This is the case with U.S. Pat. No. 5,314,421 and European patent application EP 2,806,004, in particular.

Document U.S. Pat. No. 5,314,421 discloses a blood bag label comprising a microporous plastic film comprising a matrix of interconnected pores to allow gas to enter and to exit the blood bag through a labeled area. The label includes a pressure-sensitive adhesive on a surface to enable writing on the label. Furthermore, the pores allow ink to be absorbed at least on an outer surface of the label to allow writing on the label, in particular writing a barcode. More particularly, the microporous plastic film consists of a microporous polyolefin film marketed under the Teslin brand by the company PPG Industries.

EP 2 806 004 also discloses a blood bag label comprising a flexible support and a pressure-sensitive adhesive layer deposited on one of the surfaces of the support. The support consists of a polypropylene film with a thickness of 80 μm, while the adhesive is obtained from a polyester-based resin comprising an amorphous polyester which has a glass transition temperature of between −30° C. and 7° C. and a crosslinking agent.

The latter blood bag labels, although more resistant than paper labels, have the disadvantage of providing surface defects such as edging, folds, orange peel and "tunneling" when the blood bag is sterilized, making the labels unreadable for a barcode reader. "Tunneling" is understood to mean a significant fold of the label which then forms a kind of tunnel.

Document US2016/0319164 also discloses a label polypropylene for a blood bag wherein the label is obtained in a microporous polypropylene film with a porosity of between 2500 and 4771 Gurley seconds, and wherein the polypropylene film exhibited a shrinkage of less than 2% in the machine direction and 4 to 6% in the transverse direction after exposure to a temperature of 121° C. for 30 minutes. When exposed to sterilization conditions, the label has withdrawal characteristics that closely match the withdrawal characteristics of the blood bag.

However, these labels do not make it possible to sufficiently reduce the surface defects of the edging, folds, orange peel and tunneling type when the blood bag is sterilized.

SUMMARY

One of the aims of the invention is, therefore, to overcome these disadvantages by proposing a blood bag label and a blood bag provided with such a label in a simple and inexpensive manner, and to eliminate, or at least to strongly limit, the appearance of surface defects such as edging of the adhesive mass on the periphery of the label, or mass residues, folds, orange peel and "tunneling" when the blood bag is sterilized.

For this purpose and in accordance with the invention, an adhesive label is provided that is intended to be secured to a blood bag, wherein the adhesive label comprises a flexible support and a layer of pressure-sensitive adhesive deposited on one of the surfaces of the support, wherein the label is noteworthy in that the support has a mineral filler proportion of silica and/or calcium carbonate ($CaCO_3$) and/or the like of less than 50%, and wherein the support at a temperature of 115° C. has an elongation greater than or equal to 2% when a 1.5 cm wide test piece of the support is suspended under tension by a weight of 375 g for 75 minutes, and wherein at 115° C. the blood bag has an elongation of at least 100% when a 1.5 cm wide test piece of a blood bag is suspended under tension by a weight of 375 g for 75 minutes.

Preferably, the ratio between the elongation of the support and the elongation of the blood bag is between 0.01 and 0.5, or greater than or equal to 2.5.

Advantageously, in order to allow gaseous exchanges between the inside and the outside of the blood bag, the support consists of a microporous plastic film comprising a matrix of interconnected pores.

The plastic film is made of polypropylene and/or polyethylene.

Furthermore, at a temperature of 180° C., the pressure-sensitive adhesive layer has adhesive strength on glass greater than 200 cN/cm, and preferably between 900 and 1000 cN/cm, wherein the said the adhesion to glass is determined by the standard AFERA 5001 method A.

Another object of the invention relates to a blood bag provided with an adhesive label comprising a flexible support and a pressure-sensitive adhesive layer deposited on one of the surfaces of the support; wherein the blood bag is noteworthy in that at 115° C., the support has an elongation greater than or equal to 2% when a 1.5 cm wide test piece of the support is suspended under tension by a weight of 375 g for 75 minutes, and wherein at 115° C., the blood bag has an elongation of at least 100% when a 1.5 cm wide test piece of a blood bag is suspended under tension by a weight of 375 g for 75 minutes.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

While illustrative embodiments have been illustrated and described, it will be appreciated that various changes can be made therein without departing from the spirit and scope of the invention.

Figure 1:
FIG. 1 shows a perspective view of a blood bag provided with a label according to the invention.
Figure 2:
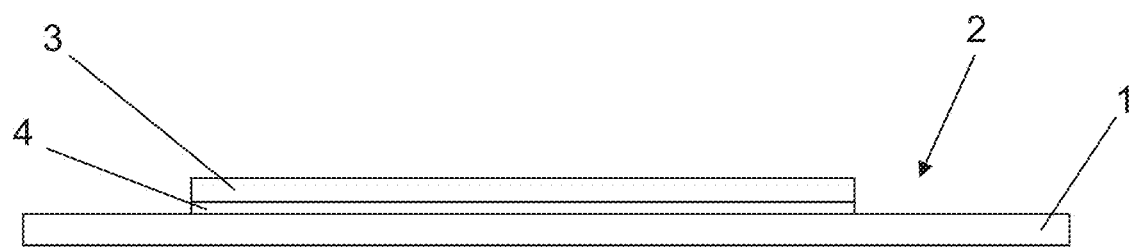
FIG. 2 shows an elevational view of a blood bag provided with a label according to the invention.

With reference to FIGS. 1 and 2, the blood bag 1 comprises an adhesive label 2 according to the invention. The blood bag 1 constitutes a container for receiving and storing blood components and is made of a flexible polyvinyl chloride (PVC) film including di-2-ethylhexyl phthalate (commonly known as DEHP) as a plasticizer, wherein the film is, for example, a PVC film marketed by Renolit® under the reference 3222.

It is clear that the blood bag may be in the form of any other blood bag made, for example, of PVC, Kraton or polypropylene, that are well known to persons skilled in the art without departing from the scope of the invention. It is obvious that the blood bag may be obtained in any type of Kraton® well known to those skilled in the art.

The label 2 according to the invention is secured to the blood bag to allow identification of the contents of the latter, wherein the label 2 is printed on its upper surface, and the printing should consist, in particular, of a bar code for this purpose. The label 2 consists of a flexible support 3 and a pressure-sensitive adhesive layer 4 deposited on the underside of the support 3. For example, the support 3 may consist of a monolayer film or a multilayer film obtained by means of an extrusion process that is well known to persons skilled in the art. The support 3 may, for example, consist of a multilayer film with 3 layers which should advantageously comprise a layer containing mineral fillers such as silica and/or titanium dioxide ($TiO_2$) and/or calcium carbonate ($CaCO_3$) and/or the like, wherein the proportion of mineral fillers is less than 50% on its outer surface in order to facilitate the printing and holding of the inks, while the central layer may comprise dyes and provide the mechanical strength required for the label function. The thicknesses of the various layers of the multilayer film may be different, wherein the thickness of the central layer is generally greater than that of the outer layers.

It should be noted that the mineral filler content of less than 50%, is determined based on the total weight of the monolayer or multilayer film forming the support 3. Thus, the mineral filler proportion corresponds to the weight of the mineral filler divided by the total weight of the film 3. In the case of a multilayer film, the mineral fillers are preferably contained in the outer layer of the film forming the support 3 in order to improve printing on the film. However, it is clear that the mineral fillers may be contained in one and/or the other of the layers of the film forming the support 3 without departing from the scope of the invention.

In order to allow gaseous exchange between the inside and the outside of the blood bag, the support 3 may consist of a microporous plastic film comprising a matrix of interconnected pores. The plastic film is made of polypropylene or polyethylene or any other material that is well known to persons skilled in the art and offers the same characteristics.

Furthermore, the pressure-sensitive adhesive layer 4 is chosen from among pressure-sensitive adhesive masses suitable for gas exchanges and preferably deposited with a basis weight between 25 $g/m^2$ and 75 $g/m^2$, preferably between 30 to 50 $g/m^2$. Furthermore at 180° C., the pressure-sensitive adhesive layer should have an adhesive strength on glass greater than 200 cN/cm, and preferably between 900 and 1000 cN/cm. For example, the adhesive may be the adhesive marketed by Avery Dennison Materials Europe GmbH, Sonnenwiesenstrasse 18, CH-8280 Kreuzlingen (TG), Switzerland under the reference Polytex® SP2020. It should be noted that the adhesive power on glass is determined by the standard AFERA 5001 method A.

Furthermore, in a particularly advantageous manner at 115° C., the support has an elongation greater than or equal to 2% when a test piece 1.5 cm wide of the support is suspended under tension by a weight of 375 g for 75 minutes, wherein the blood bag at 115° C. has an elongation of at least 100% when a test piece 1.5 cm wide of a blood bag is suspended under tension by a weight of 375 g for 75 minutes. In addition, the ratio between the elongation of the support 3 and the elongation of the blood bag is advantageously between 0.01 and 0.5 or greater than or equal to 2.5.

Figure 3:
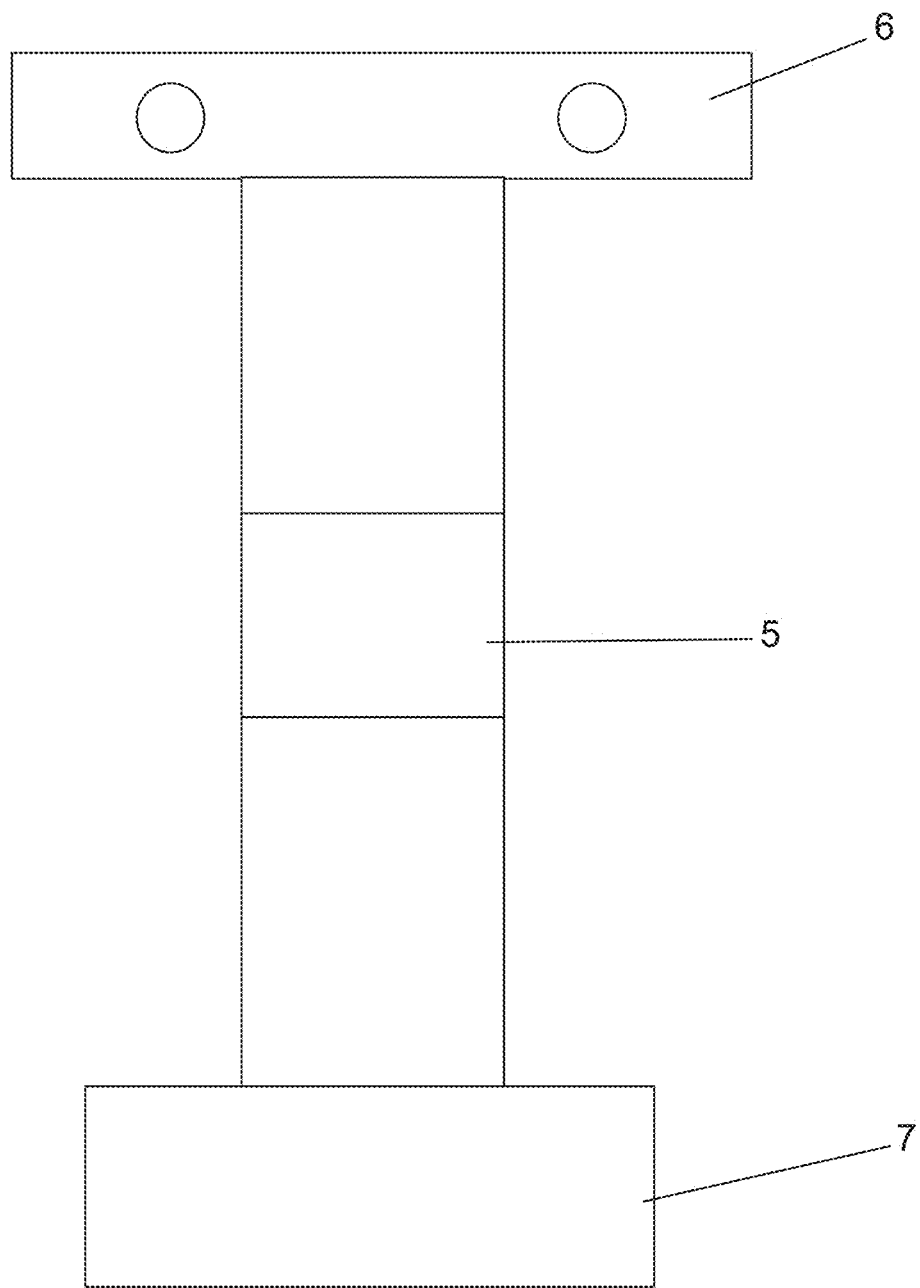
FIG. 3 shows a schematic side view of the elongation test of a label according to the invention.

The protocol for measuring the elongation of the support and the blood bag is shown in FIG. 3. It consists in producing test pieces 5 of the support 3 by means of a stamp, fixing the test pieces 5 on a support 6, and fastening a weight 7 of 350 grams (+25 grams for the fixing clamp) at the lower end of the test pieces 5. The test pieces 5 are rectangular and are 1.5 cm wide. Two parallel transverse lines separated by a distance of 2 cm, for example, are made on the test pieces. The assembly is then placed in an oven (not shown in the figures), in which the temperature is brought to 115° C. (which corresponds substantially to the sterilization temperature of an autoclave) for 75 minutes and then the distance between the two transverse lines is measured in order to calculate the percentage elongation of the support following sterilization.

When the elongation of the support 3 is greater than or equal to 2% and the ratio between the elongation of the support 3 and the elongation of the blood bag lies between 0.01 and 0.5, or greater than or equal to 2.5, then this avoids, or at least largely limits, the appearance of surface defects such as edging, folds, orange peel and "tunneling" when the blood bag is sterilized.

EXAMPLE

A label is made from a support made of a polypropylene film marketed by the company RKW under the reference FPO® Film 407 White 407-11 SA233CF and on which is deposited an adhesive mass marketed by the company Avery Dennison Materials Europe GmbH under the reference Polytex SP2020 with a basis weight of 50 g/m². The label is positioned on a blood bag made from a film sold by the company Renolit® under the reference 3222. The elongation of the support 3 of the label is greater than or equal to 300% according to the measurement protocol described above, while the ratio between the elongation of the support 3 and the elongation of the blood bag is greater than or equal to 2.5 in the transverse direction. The bloodbag/label assembly is sterilized at 115° C. for 30 minutes in an oven. The adhesive power (PA) at 180° C. on glass is 940 cN/cm and, after one month at 40° C., is 790 cN/cm. After sterilization, the label has an adhesion of 2660 cN/5 cm and, after sterilization and 8 days at 60° C., the label has an adhesion of 1260 cN/5 cm. The appearance of the label on the blood bag after sterilization, is almost unchanged. In fact, the label has only one fold of a very small thickness which does not affect the readability of the bar code or other information elements printed on the label.

In this example, the elongation of the support FPO® Film 407 White 407-11 SA233eF when a test piece 1.5 cm wide of the support is suspended under tension by a weight of 375 g for 75 minutes at 115° C. is greater than or equal to 300%, while the elongation of the support on which is deposited the pressure-sensitive adhesive layer of Polytex SP2020, under the same conditions, has an elongation greater than or equal to 300%.

In comparison, a label made from a support made of a polyethylene film called Teslin sold by the company Baxter and on which is deposited an adhesive mass marketed by AVERY under the reference POLYTEX 7011 with a basis weight of 50 g/m², is positioned on a blood bag made from a thin film containing a DEHP plasticizer which is sterilized at 121° C. for 30 minutes in an oven. The Teslin film forming the support of the label has a mineral fill rate greater than or equal to 50%. On the other hand, elongation of the Teslin support when a test piece 1.5 cm wide of the support is suspended under tension by a weight of 375 g for 75 minutes at 115° C., is 145%. After sterilization, the label has an adhesion of 3210 cN/5 cm and, after sterilization and 8 days at 60° C., the label has an adhesion of 1900 cN/5 cm (adhesive rupture). The appearance of the label on the blood bag, after sterilization, is profoundly altered. In fact, the label has folds and an edging of adhesive mass that are likely to alter the readability of the bar code or other information elements printed on the label in particular.

It will be observed that the film of the blood bag 2 usually has a thickness of between 100 and 500 μm, that the label support 3 usually has a thickness of 100 and 3000 μm, and that the layer of pressure-sensitive adhesive 4 generally has a thickness between 5 and 50 μm; however, the film thickness of the blood bag 2, the label carrier 3 and the pressure sensitive adhesive layer 4 have no effect. Thus, the label 3 and the blood bag 2 may have any thickness since the elongation characteristics as described above, are well respected.

It should be noted, of course, that the present invention is in no way limited to the embodiments described above and that many modifications may be made without departing from the scope of the appended claims.

The invention claimed is:

1. A blood bag provided with an adhesive label comprising a flexible support and a layer of pressure-sensitive adhesive deposited on a surface of the flexible support, wherein the blood bag is made of Polyvinyl chloride (PVC), styrenic block copolymer, or, polypropylene, wherein the flexible support comprises a mineral filler rate of silica and/or calcium carbonate ($CaCO_3$), less than 50%, wherein at 115° C., the flexible support has an elongation greater than or equal to 2% when a test piece 1.5 cm wide of the flexible support is suspended under tension by a weight of 375 g for 75 minutes, and wherein at 115° C., the blood bag has an elongation of at least 100% when a test piece 1.5 cm wide of a blood bag is suspended under tension by a weight of 375 g for 75 minutes.

2. The blood bag according to claim 1, wherein the ratio between the elongation of the flexible support and the elongation of the blood bag lies between 0.01 and 0.5, or equal to 2.5.

3. The blood bag according to claim 2, wherein flexible the support consists of a microporous plastic film comprising a matrix of interconnected pores.

4. The blood bag according to claim 3, wherein the plastic film is made of polyethylene.

5. The blood bag according to claim 4, wherein the plastic film is made of polypropylene and polyethylene.

6. The blood bag according to claim 3, wherein the plastic film is made of polypropylene.

7. The blood bag according to claim 1, wherein the adhesive layer has an adhesive power on glass between 900 and 1000 cN/cm at 180° C.

8. An adhesive label intended to be secured to a blood bag made of Polyvinyl chloride (PVC), styrenic block copolymer, or polypropylene, wherein the adhesive label comprises a flexible support and a layer of pressure-sensitive adhesive deposited on a surface of the support, wherein the flexible support has a silica and/or calcium carbonate (CaCO3) content of less than 50%, wherein at 115° C. the flexible support has an elongation greater than or equal to 2% when a test piece 1.5 cm wide of the flexible support is suspended under tension by a weight of 375 g for 75 minutes, and wherein the blood bag at 115° C. has an elongation of at least 100% when a test piece 1.5 cm wide of a blood bag is suspended under tension by a weight of 375 g for 75 minutes.

9. The adhesive label according to claim 8 wherein the flexible support consists of a microporous plastic film comprising a matrix of interconnected pores.

10. The adhesive label according to claim 9, wherein the plastic film is made of polyethylene.

11. The adhesive label according to claim 10, wherein the plastic film is made of polypropylene and polyethylene.

12. The adhesive label according to claim 9, wherein the plastic film is made from polypropylene.

13. The adhesive label according to claim 8, wherein the pressure-sensitive adhesive layer has an adhesive strength on glass of greater than 200 cN/cm at 180° C.

14. The adhesive label according to claim 13, wherein the adhesive layer has an adhesive power on glass between 900 and 1000 cN/cm at 180° C.

15. The adhesive label according to claim 8, wherein the ratio between the elongation of the flexible support and the elongation of the blood bag lies between 0.01 and 0.5, or equal to 2.5.

* * * * *

UNITED STATES PATENT AND TRADEMARK OFFICE
CERTIFICATE OF CORRECTION

PATENT NO. : 10,716,734 B2
APPLICATION NO. : 15/849202
DATED : July 21, 2020
INVENTOR(S) : M. Williams et al.

Page 1 of 1

It is certified that error appears in the above-identified patent and that said Letters Patent is hereby corrected as shown below:

| Column | Line | |
|---|---|---|
| On the Title Page | | |
| Abstract | 13 | "↓ minutes" to -- 75 minutes -- |
| In the Claims | | |
| 6 | 21 | Claim 3 "flexible the" to -- the flexible -- |

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*